UNITED STATES PATENT OFFICE.

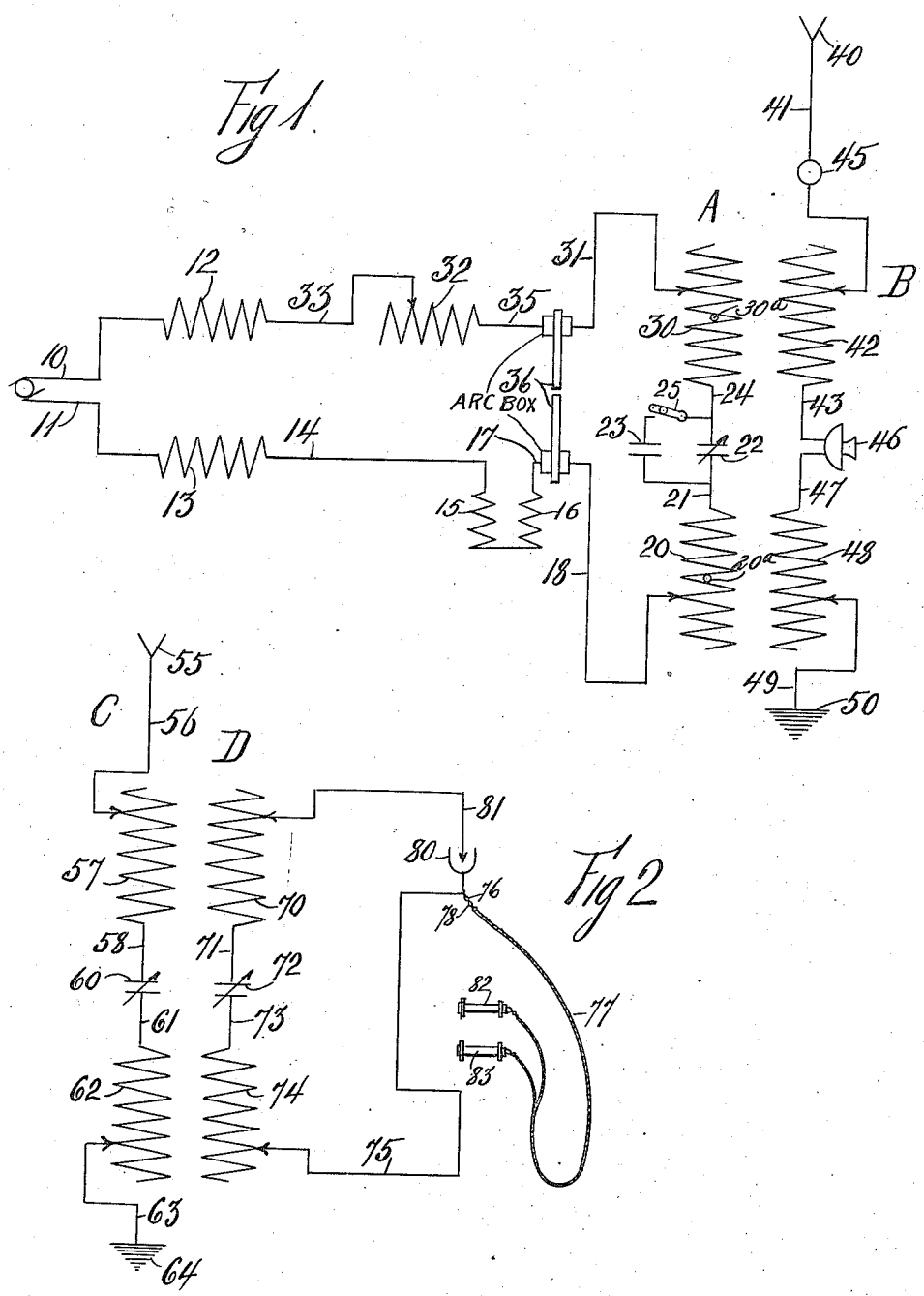

ELMAN B. MYERS, OF NEW YORK, N. Y.

APPARATUS FOR WIRELESS TELEPHONY.

1,168,541.

Specification of Letters Patent. Patented Jan. 18, 1916.

Application filed December 27, 1911. Serial No. 668,047.

*To all whom it may concern:*

Be it known that I, ELMAN B. MYERS, a citizen of the United States, and a resident of the borough of Manhattan, in the county of New York and State of New York, have invented certain new and useful Improvements in Apparatus for Wireless Telephony, of which the following is a specification.

The object of this invention is the production of a selectively and secretly tuned system of wireless telephony.

The object of the invention is obtained by producing high frequency oscillations, by means of an electric arc generated in an atmosphere containing sodium vapor, hydrogen or the like, shunted by concentrated inductance and a capacity, or producing the high frequency oscillations by other means.

With the invention voice oscillations form on an aerial, by means of a transmitter in series with the aerial and the ground, between variable concentrated inductances.

The organization of the invention is particularly characterized by a sending station, which among its elements contains two pairs of transformers with variable concentrated coils, the secondary coils of the tranformers having a transmitter connected up between them and the primary coils have connected between them a fixed and a variable condenser. A receiving station is shown which coacts with the sending station and also contains two pairs of transformers with variable concentrated coils, the primary and secondary coils having respectively between them variable condensers.

In the accompanying drawings Figure 1 represents a diagrammatic view exemplifying a transmitting or sending station and Fig. 2 shows a diagrammatic view of a receiving station.

Referring to Fig. 1 main line wires are represented at 10, 11, which extend from a source of electric energy. Choke coils 12, 13 are in series with said wires 10 and 11 respectively. A wire 14 connects the coil 13 and the magnetic fields 15, 16 which are used for the generation of magnetism for the arc box to be described. From the field 16 extend the wires 17, 18 that lead to the concentrated primary variable inductance coil 20. The coil 20 is connected to a variable condenser 22 and stationary condenser 23 by means of the wire 21. A wire 24 extends from the variable condenser 22 and a switch 25 connects the wire 24 with the stationary condenser 23. The wire 24 leads to the concentrated primary variable inductance coil 30. A wire 31 connects the coil 30 with the variable line resistance coil 32. A wire 33 connects the resistance coil 32 with the choke coil 12. An arc box 36 is connected up between the wires 17 and 35. An aerial capacity 40 has extending therefrom the wire 41 with the hot wire ammeter 45. The wire 41 connects with the secondary variable concentrated inductance coil 42. A wire 43 connects the coil 42 with the transmitter or microphone 46. A wire 47 connects the transmitter 46 with the secondary concentrated variable inductance coil 48, and a wire 49 connects the coil 48 with the ground 50. The coils 42 and 48 respectively balance the coils 30 and 20. The coils 20, 30, 42 and 48 are designated concentrated coils, by reason of the fact that they are made of insulated wire with the separate coils thereof bearing on each other. There is not enough difference of potential between the turns of each coil to break down the insulation thereof. With this form of coil a very long length of wire can be obtained within very small outside dimensions. The coils being concentrated give very powerful radiation or lines of force within a small space. The coils 20 and 30 are adjusted in different angular positions about axes indicated respectively at 20$^a$ and 30$^a$ to produce the coupling between the primary and secondary coils, and which has the effect of turning or balancing the primary and secondary coils. It will be noted that preferably the coils 20 and 30 as well as the coils 42 and 48 are wound in opposite directions to each other. Also the coils 30 and 42 and 20 and 48 are preferably wound in opposite directions to each other. The coils 30 and 42 constitute a transformer of the sending station, and the coils 20 and 48 constitute a second transformer of the sending station. The coils 57 and 70 constitute a transformer of the receiving station and the coils 62 and 74 constitute a second transformer of the receiving station. The variable condenser 22 and stationary condenser 23 between the coils 20 and 30 bring the circuit designated by the letter A in complete resonance with the circuit designated by the letter B.

Referring to Fig. 2 and when the circuit designated by the letter C is in resonance with the transmitting or sending station, and the circuit designated by the letter D is in resonance with the circuit C, the incoming electro-magnetic vibrations are recorded by the detector and telephones to be described. The receiving aerial 55 is connected by the wire 56 with the variable primary receiving coil or tuner 57. A wire 58 connects the coil 57 with the variable condenser 60. A wire 61 connects the latter with variable primary receiving coil or tuner 62, and a wire 63 connects the coil 62 with the ground 64. At 70 is shown the variable secondary receiving coil or tuner from which extends a wire 71 that leads to the variable condenser 72. A wire 73 connects the condenser 72 with the variable secondary receiving coil or tuner 74. A wire 75 connects the coil 74 with one end of one of the wires 76 of the non-inductive receiving cord 77. The accompanying end to the other wire 78 of the receiving cord extends to one side of the detector 80 and the latter is connected with the coil 70 by the wire 81. Receivers 82, 83 are connected to said receiving cord 77.

Having described my invention what I desire to secure by Letters Patent and claim is:

1. In an apparatus for wireless telephony the combination in a sending station of a pair of transformers comprising a pair of primary and a pair of secondary coils, a condenser in shunt between the accompanying ends of the primary coils, a transmitter in series between the secondary coils and means to conduct an electric current to the primary coils.

2. In an apparatus for wireless telephony the combination in a sending station, a pair of transformers for the station, primary coils of the transformers in series with each side of the line, the secondary coils of the transformers in series with each other and a transmitter between the latter coils, each primary coil rotatable on an axis to adjust the couples between said primary and secondary coils and thereby assist in balancing or tuning said coils.

3. In an apparatus for wireless telephony the combination of a sending station, a pair of transformers for the station, primary coils in series with each other for the transformers, a variable condenser and a stationary condenser between said coils, a switch between the coils, a pair of secondary coils in series with each other for the transformers, an aerial for one of the secondary coils, a ground wire for the other secondary coil, a transmitter between the two secondary coils, a pair of main line wires for electric current for the primary coils and an arc box connected up with the latter wires.

Signed at the borough of Manhattan in the county of New York and State of New York this 26th day of December A. D. 1911.

ELMAN B. MYERS.

Witnesses:
A. A. DE BONNEVILLE,
P. A. RITGER.